United States Patent
Lamb et al.

(10) Patent No.: US 10,802,514 B2
(45) Date of Patent: Oct. 13, 2020

(54) DUAL MODE THERMAL ACTUATOR

(71) Applicant: Rostra Vernatherm, LLC, Bristol, CT (US)

(72) Inventors: Kevin W. Lamb, Naples, FL (US); Alberto D. Medina Santamaria, Bristol, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 35 days.

(21) Appl. No.: 16/028,995

(22) Filed: Jul. 6, 2018

(65) Prior Publication Data

US 2020/0011351 A1   Jan. 9, 2020

(51) Int. Cl.
| | |
|---|---|
| *G05D 23/02* | (2006.01) |
| *G05D 23/30* | (2006.01) |
| *F15B 11/036* | (2006.01) |
| *G05D 23/19* | (2006.01) |
| *G05D 23/24* | (2006.01) |
| *G05D 23/275* | (2006.01) |

(52) U.S. Cl.
CPC .......... *G05D 23/30* (2013.01); *F15B 11/0365* (2013.01); *G05D 23/1921* (2013.01); *G05D 23/1925* (2013.01); *G05D 23/24* (2013.01); *G05D 23/27537* (2013.01)

(58) Field of Classification Search
CPC ... F15B 11/0365; G05D 23/02; G05D 23/021; G05D 23/022; G05D 23/19; G05D 23/1925; G05D 23/1921; G05D 23/275; G05D 23/27537; G05D 23/30
See application file for complete search history.

(56) References Cited

U.S. PATENT DOCUMENTS

| | | | |
|---|---|---|---|
| 2,743,703 A | 5/1956 | Miller | |
| 2,974,869 A * | 3/1961 | Hajny | G05D 23/1919 236/1 R |
| 2,989,281 A * | 6/1961 | Fritts | F03G 7/06 251/11 |
| 3,168,805 A * | 2/1965 | Fleury | F16K 31/025 60/531 |
| 3,196,218 A | 7/1965 | Weeks | |
| 3,374,337 A | 3/1968 | Burley | |
| 4,296,677 A | 10/1981 | Little et al. | |
| 4,961,530 A * | 10/1990 | Wagner | F01P 7/167 236/100 |
| 6,109,588 A | 8/2000 | Cerrano | |

(Continued)

*Primary Examiner* — Jonathan Bradford
(74) *Attorney, Agent, or Firm* — Alix, Yale & Ristas, LLP

(57) ABSTRACT

A dual mode thermal actuator (hereafter "the actuator") includes a first cup defining a first chamber filled with thermally-responsive wax and a second cup defining a second chamber filled with thermally-responsive wax. A piston is disposed between the first and second cups. A first guide is received by the first cup. The first guide surrounds the piston and extends axially away from the first cup. A second guide is received by the second cup. The second guide surrounds the piston and extends axially away from the second cup. Expansion of the wax in the first chamber or expansion of the wax in the second chamber causes the actuator to go from a retracted position to an extended position. Expansion of the wax in the first chamber and expansion of the wax in the second chamber also causes the actuator to go from the retracted position to the extended position.

21 Claims, 7 Drawing Sheets

(56) References Cited

U.S. PATENT DOCUMENTS

| | | | |
|---|---|---|---|
| 6,505,580 B2 * | 1/2003 | Chamot | F01P 7/167 123/41.1 |
| 6,817,067 B2 | 11/2004 | Kopp et al. | |
| 2002/0053325 A1 * | 5/2002 | Fishman | F01P 7/167 123/41.1 |
| 2014/0292139 A1 | 10/2014 | Gaj | |
| 2016/0265618 A1 | 9/2016 | Berg et al. | |

* cited by examiner

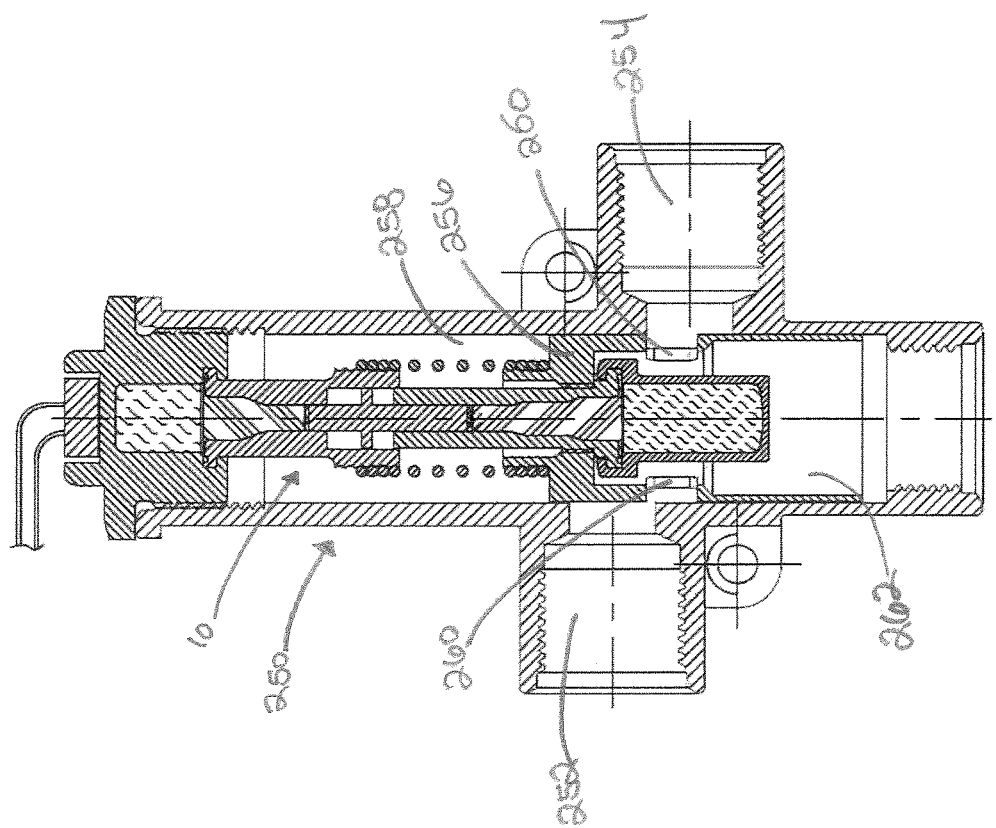
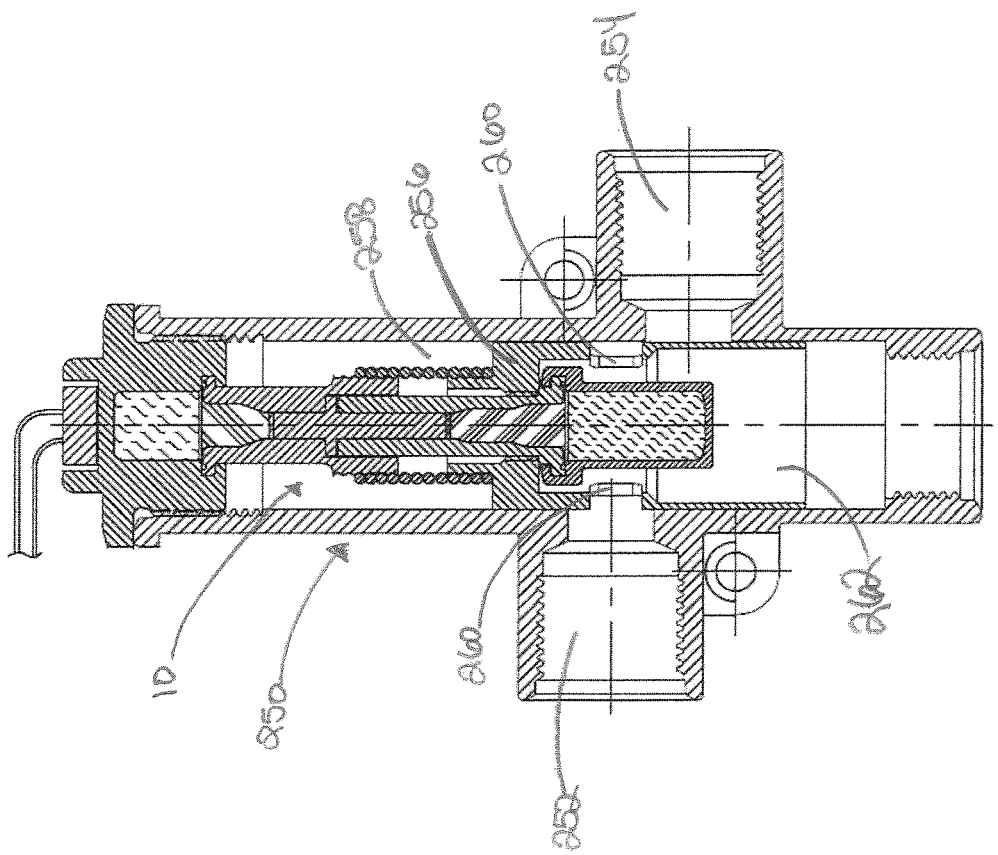

DUAL MODE THERMAL ACTUATOR

BACKGROUND

The present disclosure relates to thermally actuated flow-control valves. More particularly, the present disclosure relates to valves including wax-filled actuators employed to control the flow of fluid in a system.

In one example of wax-filled actuators, the wax-filled actuators are designed to extend and retract in response to a predetermined change in temperature. In many temperature sensitive environments, it is desirable to stop or restrict flow of fluid to designated fluid passages when the fluid is cool. As the fluid warms up, the wax-filled actuator begins to extend, and permits fluid to flow. As the temperature of the fluid increases, the wax-filled actuator progressively reaches its fully extended/open position—when the fluid reaches a predetermined operating temperature. The wax-filled actuator may fluctuate between a nominal extended position and the fully extended position as the environmental temperature fluctuates.

A wax-filled actuator conventionally comprises a rigid cup surrounding a chamber filled with wax formulated to transition from solid to liquid in response to a predictable increase in temperature. The cup is made of a strong, thermally conductive material, such as brass, although other materials may be suitable. A piston is arranged to reciprocate in a guide that defines a bore in communication with the chamber. A flexible diaphragm, plug, and/or other seal arrangement may be disposed between the wax and the piston to contain the wax in the chamber. The wax expands in volume as the wax becomes a liquid, generating a force that is directed into the bore of the guide, and moves the piston away from the chamber. Thus, the axial length of the actuator changes according to the temperature of the wax, which is responsive to the temperature of the surrounding environment.

The wax-filled actuator is typically positioned in a housing or opening, with the piston arranged to transmit the force of the expanding wax to a valve member or to move the actuator body (the cup and/or guide) which may act as, or include a valve member. The delivery of force to a valve member and/or the actuator body changes a flow path or creates a new flow path for the fluid in the system. A return spring is typically positioned to return the actuator to its retracted/cold position when the temperature of the fluid falls and the wax returns to its smaller volume. The return spring is selected to overcome the friction of the piston in the axial passage and any linkage or valve associated with the actuator, to ensure reliable return to the closed or retracted position. Prior art wax-filled actuators are typically reliable temperature sensitive actuators that operate passively, requiring no external energy such as electricity, and are therefore self-contained.

It may be necessary to move the valve member and/or actuator body between retracted and extended positions either in combination with or independent of the passive wax-filled actuator. This need may arise if the passive wax-filled actuator fails or if the temperature of passive actuation requires quick adjustment.

Consequently, there exists a need for a wax-filled actuator having the option for a user and/or system to actively and intentionally control the length of the actuator to move the valve member and/or actuator body between retracted and extended positions either in combination with or independent of a passive wax-filled actuator.

SUMMARY OF THE INVENTION

The disclosed dual mode thermal actuator includes two wax-filled chambers arranged so that expansion of the wax in either chamber acts to extend the actuator. One wax filled chamber is provided with an electric heater to heat and expand the wax in response to a control signal, while the other wax filled chamber is arranged to passively respond to a temperature. The active mode extension of the actuator can supplement the passive mode extension, or act as a back-up mode of extending the actuator in case the passive mode wax chamber fails.

According to aspects illustrated herein, a dual mode thermal actuator (hereafter, "the actuator") comprises first and second cups filled with wax that changes from a solid to a liquid in response to a pre-determined increase in temperature. The wax may be referred to as "thermally responsive wax." The first and second cups each have an open end that receives a guide defining a bore. A diaphragm and plug, or other seal is arranged to contain the wax in the cup and direct force from the expanding wax into the bore of the guide. A piston is disposed between the first and second cups and received in the bores defined by the guides, with expansion of the wax in either cup acting on opposite ends of the piston to extend the actuator. The disclosed dual mode actuator has a fully retracted length, where the wax is not expanded in either chamber, a passively actuated length, where the wax in the passive chamber is expanded, an actively actuated length, where the wax in the actively heated chamber is expanded, and a fully extended length, where the wax in both chambers is expanded. The passively actuated length and the actively actuated length can be substantially the same length.

The first cup includes a resistance heater that can be selectively heated by connection to electrical power. When the resistance heater is not receiving power, the wax in the first cup is not expanded and the piston is in a retracted position relative to the first cup. When the resistance heater receives power, the wax in the first chamber expands and the piston is moved to an extended position relative to the first cup. The second cup is exposed to an ambient heat source. When the temperature of the ambient heat source is below a threshold temperature, the wax in the second chamber is not expanded and the piston is in a retracted position relative to the second cup. As the ambient temperature to which the second cup is exposed increases past the threshold temperature, the wax in the second chamber expands and moves the piston to an extended position relative to the second cup. The temperature range that causes the wax in the first cup to expand may be higher than the temperature range that causes the wax in the second cup to expand such that the threshold ambient temperature that causes expansion of the wax in the second cup does not also cause expansion of the wax in the first cup.

Force generated by expansion of wax in the first cup acts to move the piston away from the first cup, while force generated by expansion of wax in the second cup acts to move the piston away from the second cup. The first cup is held in a fixed position, so as the piston moves away from either cup, the actuator extends in length, with the second cup being projected farther away from the first cup. The piston includes a radial flange that defines a retracted position of the piston with respect to both cups. The guide extending from the first "active" cup is configured to receive and surround the guide extending from the second "passive" cup. The flange on the piston seats against an annular shoulder defined within the first guide to define the retracted position of the piston relative to the first cup. The flange on the piston seats against the annular end of the second guide to define the retracted position of the piston relative to the second cup. A return spring surrounds the overlapping first and second guides and is arranged to move the piston, second guide and second cup to a fully retracted position when the wax in both cups is not expanded.

In the disclosed embodiment, the second cup also serves as a valve member. The actuator is mounted in a housing so that the second cup is positioned to close or open an aperture, depending upon the length of the actuator. The disclosed dual mode actuator can be used for other purposes, such as moving a valve that is not part of the actuator or moving another structure.

According to aspects illustrated herein, a method of actuating includes providing a first cup having a resistance heater and defining a first chamber filled with thermally-responsive wax and providing a second cup exposed to an ambient heat source and defining a second chamber filled with thermally-responsive wax. An increase in temperature of the resistance heater causes the thermally-responsive wax in the first chamber to expand and the actuator to go from a retracted position to an actively extended position. An increase in temperature of the ambient heat source causes the thermally-responsive wax in the second chamber to expand and the actuator to go from the retracted position to the passively extended position.

BRIEF DESCRIPTION OF THE DRAWINGS

Aspects of a disclosed embodiment will be described in reference to the drawings, where like numerals reflect like elements:

FIG. 7A is a front cross-sectional view of the dual mode actuator in use as a mixing valve in a first state within a manifold; and FIG. 7B is a front cross-sectional view of the dual mode actuator in use as a mixing valve in a second state within the manifold.

DETAILED DESCRIPTION

Figure 1:
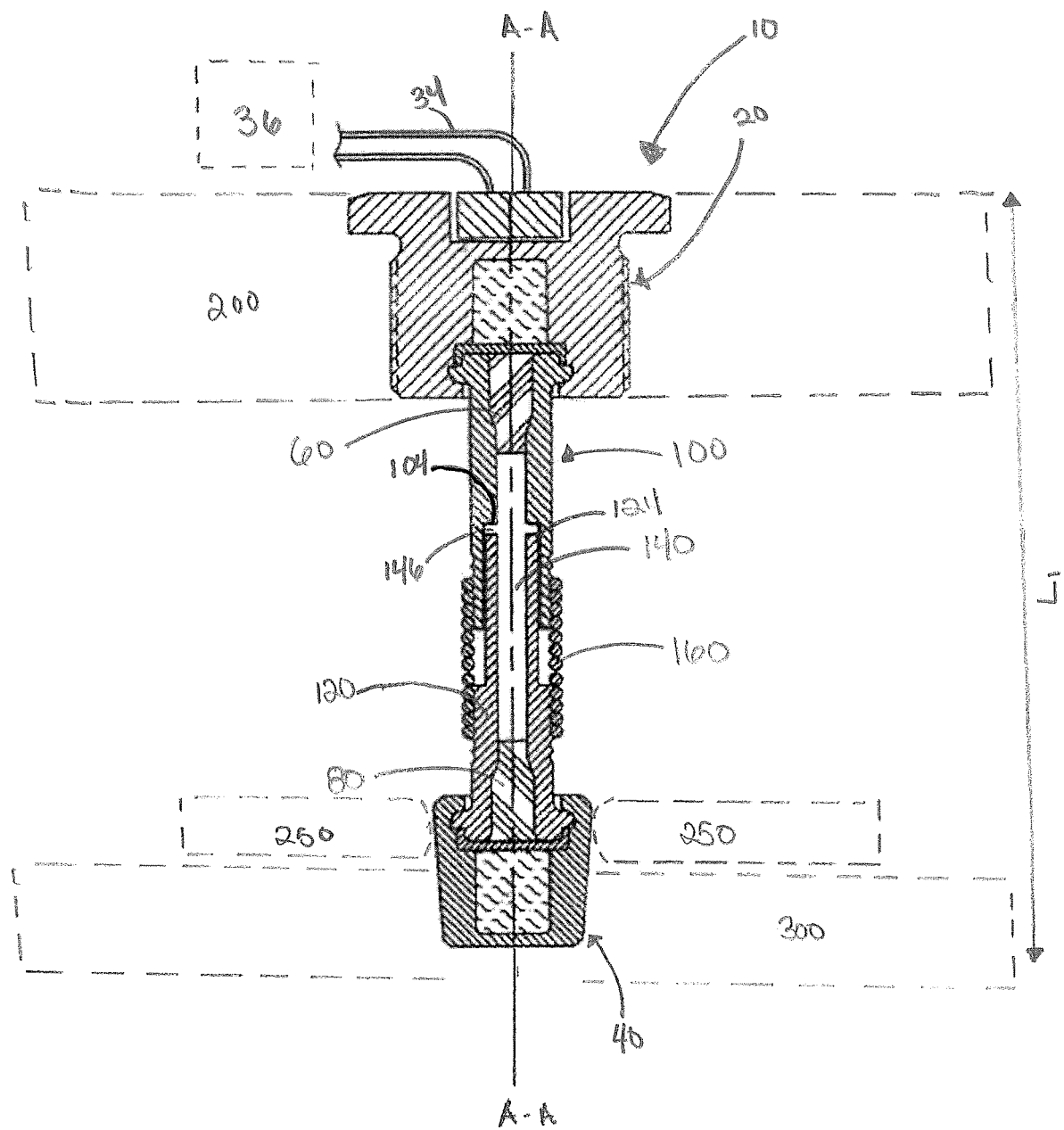
FIG. 1 is a front cross-sectional view of the dual mode actuator (hereafter, "the actuator") according to aspects of the disclosure.

An embodiment of a dual mode actuator (hereafter, "the actuator") according to aspects of the disclosure will now be described with reference to FIGS. 1-7B. The actuator will generally be referred to by the reference numeral 10. Various materials, methods of construction, methods of manufacture, and methods of fastening will be discussed in the context of the disclosed embodiment. Those skilled in the art will recognize known substitutes for the materials, manufacturing methods, and fastening methods, all of which are contemplated as compatible with the disclosed embodiment and are intended to be encompassed by the appended claims.

One example of a use for the actuator 10 is to move a valve member in response to a change in ambient temperature (passively) or in response to the application of electrical power (actively). Active movement of a valve member requires an external energy source and permits active control of the position of the valve member. Passive movement of the valve member is dependent upon the ambient temperature to which the wax filled cup is exposed. Passive movement of the valve member does not require an external energy source, but does not permit external control of valve movement. The disclosed actuator 10 incorporates components and features designed to extend the actuator 10 actively and/or passively.

As shown in FIG. 1 with reference to a disclosed embodiment, the actuator 10 has a longitudinal axis A-A and includes first and second thermally conductive cups 20, 40. The first and second cups 20, 40 are each filled with a thermally-responsive wax 28, 48. A first guide 100 is received by the first cup 20 and a second guide 120 is received by the second cup 40. A first plug 60 is disposed within the first guide 100 and a second plug 80 is disposed within the second guide 120. First and second flexible diaphragms 62, 82 contain the wax 28, 48 in each cup 20, 40. A piston 140 is positioned between the first and second plugs 60, 80 to axially reciprocate between retracted and extended positions relative to each cup 20, 40. A return spring 160 extends from the first guide 100 to the second guide 120 and exerts a return biasing force $F_B$ upon the actuator 10 toward the first cup 20 and/or the retracted position. The first and second cups 20, 40, the first and second guides 100, 120, are made from brass, or another suitable material. The piston 140 may be stainless steel or other suitable material.

Figure 5A:
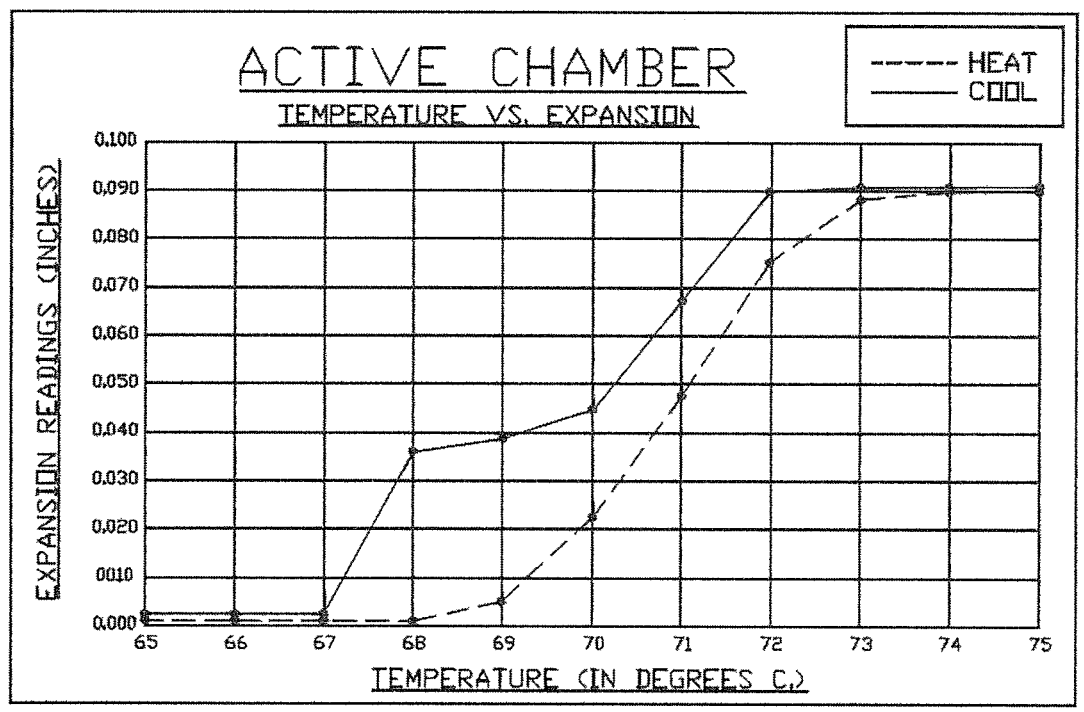
FIG. 5A is a graphical representation of change in temperature and expansion of a thermally-responsive wax in an actively heated chamber according to aspects of the disclosure.
Figure 5B:
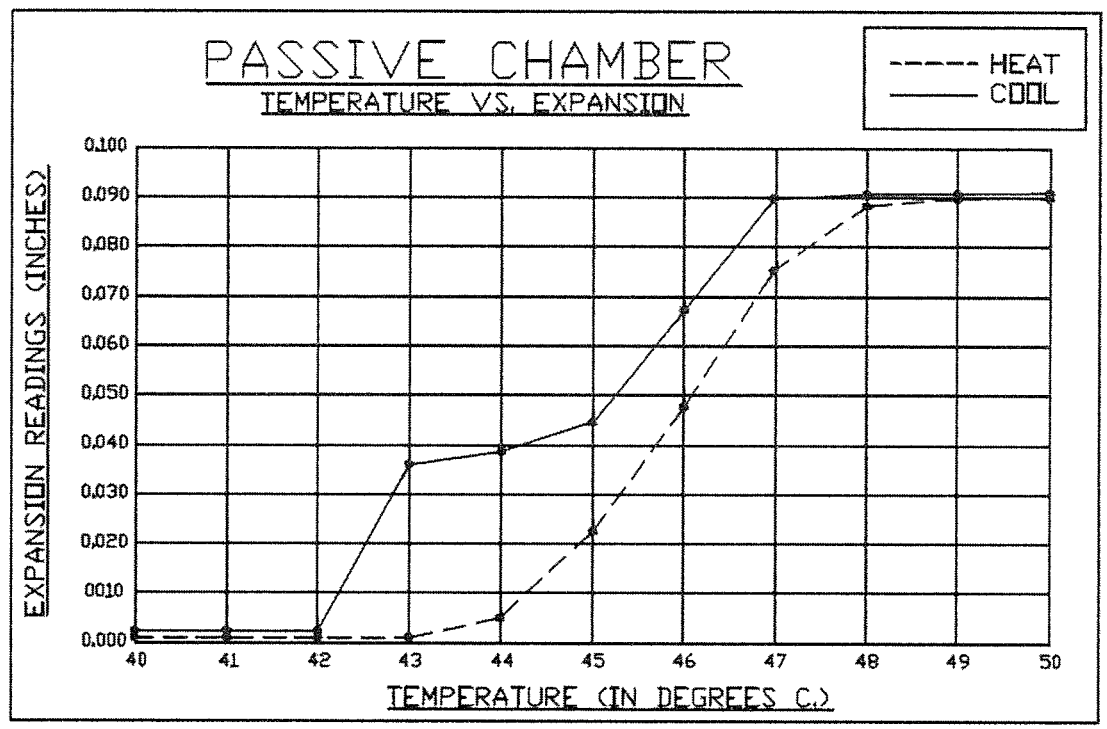
FIG. 5B is a graphical representation of change in temperature and expansion of a thermally-responsive wax in a passively heated chamber according to aspects of the disclosure.
Figure 6A:
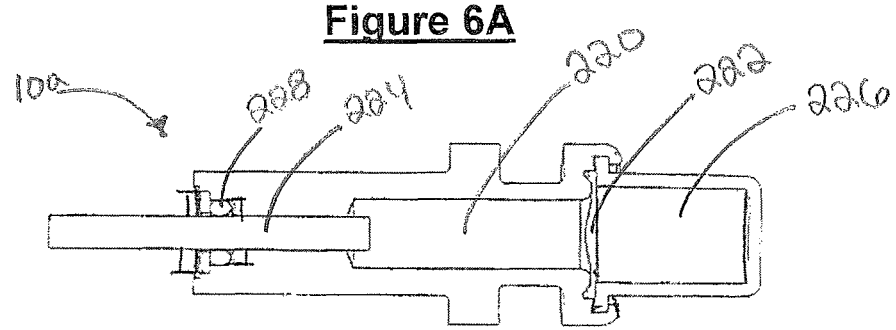
FIG. 6A is a partial front cross-sectional view of an alternative embodiment of a wax-filled actuator with emphasis on an incompressible fluid according to aspects of the disclosure.
Figure 6B:
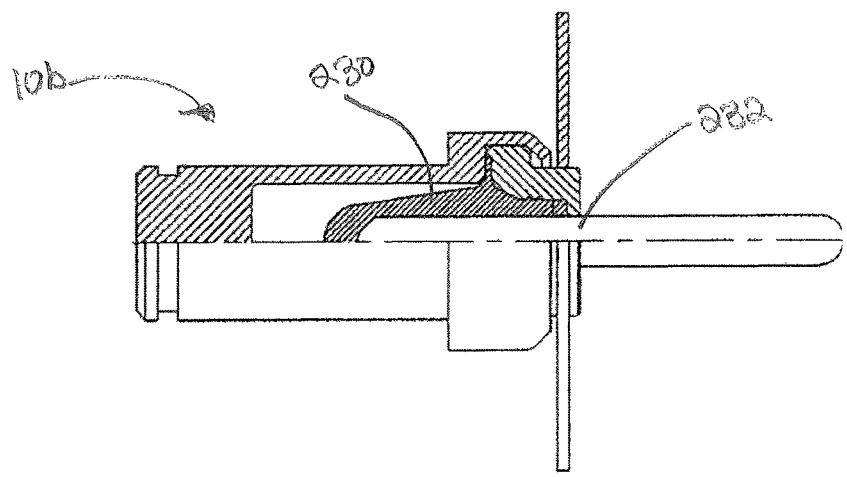
FIG. 6B is a partial front cross-sectional view of an alternative embodiment of a wax-filled actuator with emphasis on a diaphragm according to aspects of the disclosure.
Figure 6C:
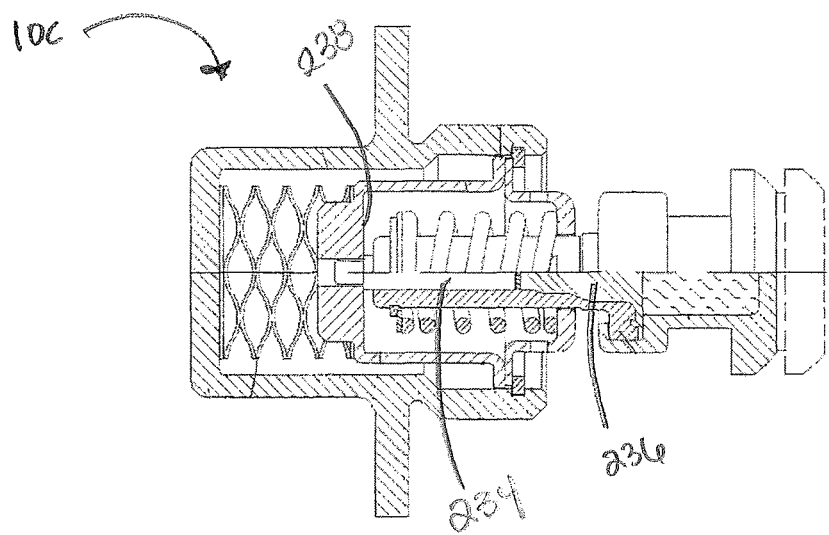
FIG. 6C is a front cross-sectional view of an alternative embodiment of a wax-filled actuator according to aspects of the disclosure.

In the disclosed actuator 10, a diaphragm 62, 85 is trapped at its periphery between the cup 20, 40 and the guide 100, 120. The diaphragms 62, 82 are usually formed from nitrile rubber or other flexible material. Rubber plugs 60, 80 are arranged in the bore of each guide 100, 120 and function to transmit force from the expanding wax 28 48 to a respective end of the piston 140. The diaphragm and plug arrangement is one way of containing the wax and transmitting force from the wax to the piston, but other configurations are possible, as shown in FIGS. 5A and 5B. In FIG. 6A, in actuator embodiment 10a, diaphragm 222 contains wax 226 in the cup. Expansion of the wax 226 distorts the diaphragm and displaces an incompressible fluid 220 to transmit force from the wax 226 to the piston 224. Seals 228 prevent leakage of the incompressible fluid past the piston 224. It is possible to omit the incompressible fluid 220 and diaphragm 222 and expose the piston directly to the wax 226, which is contained by a seals 228. In FIG. 6B, an actuator 10b may employ a synthetic rubber sleeve-like component 230 shaped like the "finger of a glove" which surrounds a piston 232. As temperature increases, pressure from expansion of a thermostatic material moves the piston 232 with a lateral squeeze and an axial push. In FIG. 6C, a stepped piston 234 is trapped between a plug 236 and an abutment 238 and engages the abutment 238.

As illustrated in FIG. 1, the actuator 10 may be arranged to move a valve member to alter circulation patterns in a fluid flow system. In this use, the first cup 20 may be coupled to an opening in a housing 200. The opening in the housing 200 may include an inner surface having a plurality female threads for forming a threaded connection to an outer surface of the first cup 20 having complimentary male threads. The second cup 40 may be disposed within an annular opening 250 to a reservoir 300 in the fluid flow system. In this configuration, the second cup 40 acts as a valve member by altering fluid flow through the opening 250 depending upon the length of the actuator 10. The second cup 40 is exposed to fluid in the system. The wax 28, 48 in each cup 20, 40 is selected to transition from solid to liquid in response to a predetermined increase in temperature. The volume of wax in each cup 20, 40 can be varied to change the amount of wax 28, 48 to match the force and stroke of the actuator 10 to specific uses. The stroke is the change in length of the actuator 10.

Figure 2:
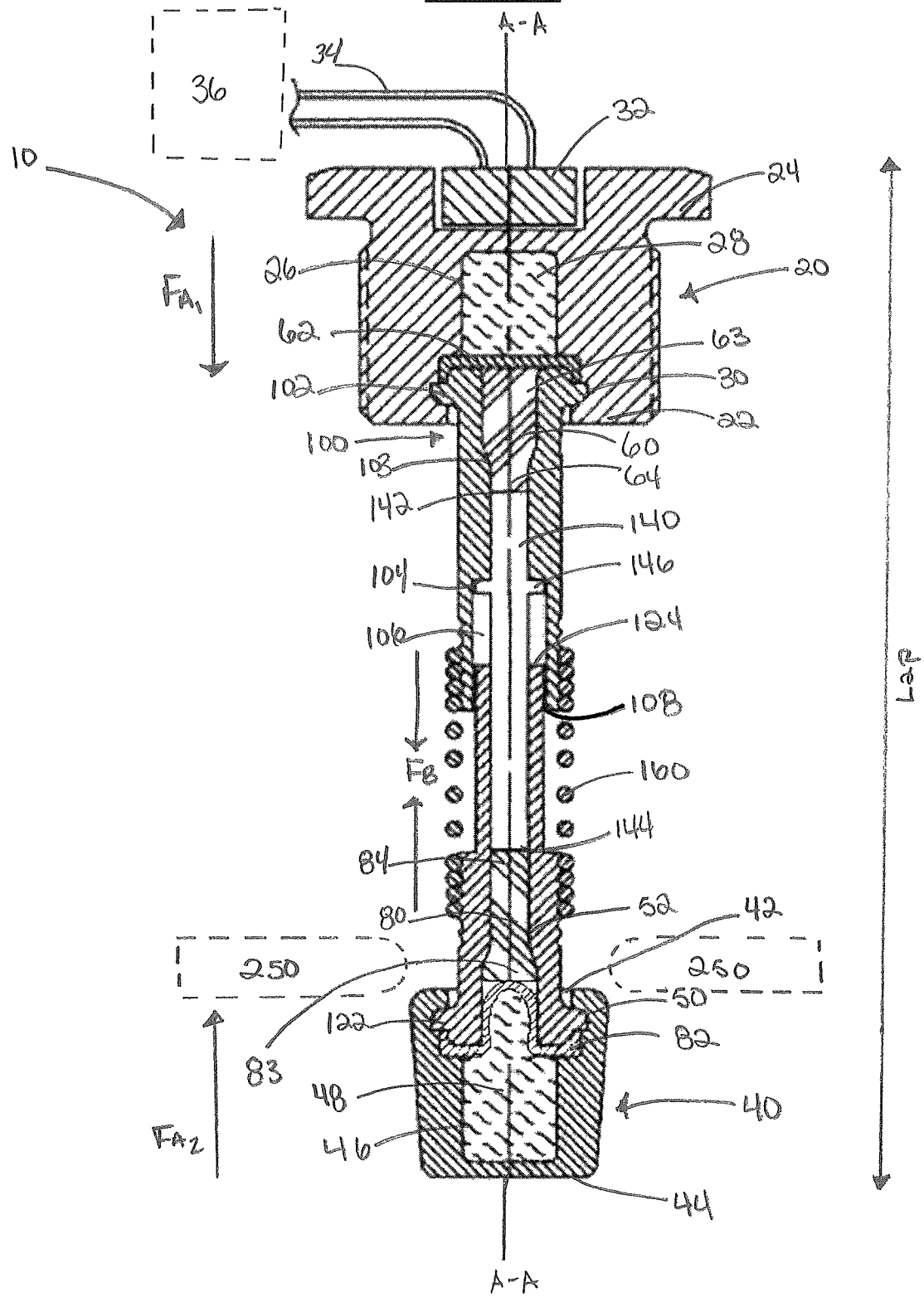
FIG. 2 is a front cross-sectional view of the actuator of FIG. 1.
Figure 3:
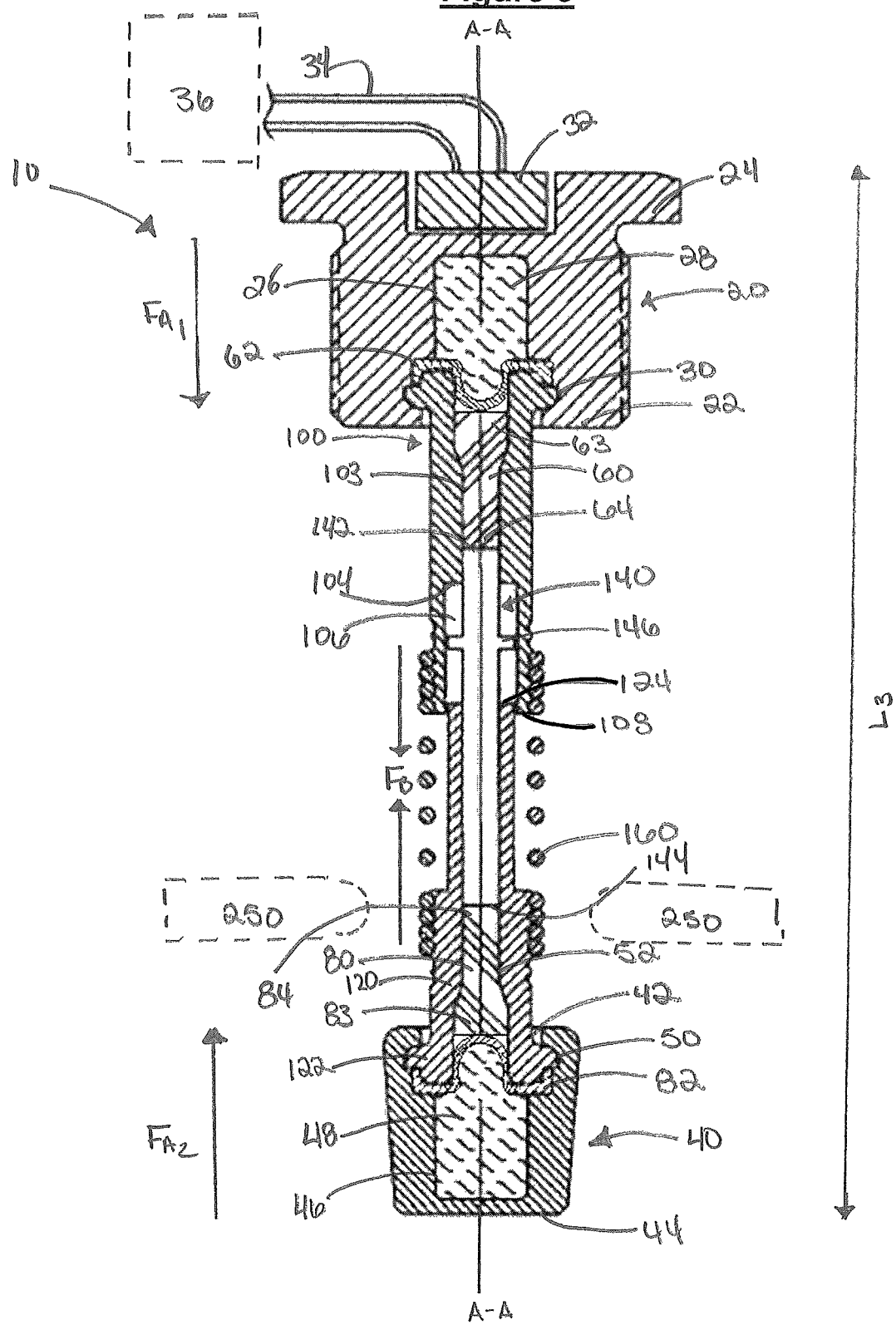
FIG. 3 is a front cross-sectional view of the actuator of FIG. 1.

In the disclosed embodiment, the actuator 10 has four possible lengths, retracted, passively extended (see FIG. 2), actively extended (see FIG. 4), and fully extended (both passively and actively extended as shown in FIG. 3). The actively extended length and the passively extended length may be the same or different, depending upon the design and use of the actuator 10. The volume of the wax 28, 48 expands during the transition from solid to liquid, generating pressure that distorts diaphragm 62, 82, and moves the plug 60, 80 and piston 140 away from one or both cups 20, 40. The length of the actuator 10 increases as the piston 140 is moved away from one or both cups 20, 40 against the force $F_B$ of the return spring 160. As shown in FIG. 3, force $F_{A1}$ from expanding wax 28 in the first cup 20 overcomes return bias force $F_B$ (and friction) to move the piston 140 away from the first cup 20. Piston flange 146 is separated from an inner annular shoulder (seat) 104 defined by the first guide 100. In FIG. 2 force $F_{A2}$ from expanding wax 48 in the second cup 40 overcomes return bias force $F_B$ (and friction) to move the piston 140 away from the second cup 40. Piston flange 146 is separated from an annular end (seat) 124 of the second guide 120.

Referring to FIG. 2, the first cup 20 includes an open end 22, a closed end 24, and defines a first cylindrical chamber 26 filled with thermally responsive wax 28. The open end 22 is mechanically formed, swaged, or crimped over a radially extending flange 102 of the first guide 100 to permanently secure the flange 102 in an annular slot 30 of the first cup 20. An outer edge of the diaphragm 62 is trapped between the flange 102 and the cup 20. A resistance heater 32 for heating the wax 28 is embedded in the closed end 24 of the cup. Wires 34 run from the resistance heater 32 to a remote circuit and power source 36. In the disclosed embodiment, the remote circuit and power source 36 may include sensors to detect temperature within the fluid flow system.

The first plug 60 includes a first end 63 that is in contact with the flexible diaphragm 62. The diaphragm 62 acts to contain the wax 28 within the first chamber 26 and delivers a variable actuating force $F_{A1}$ on the first plug 60 upon expansion of the wax 28 in the first chamber 26. The first plug 60 projects away from the first cup 20 and is surrounded by the first guide 100. A second end 64 of the first plug 60 abuts a first end 142 of the piston 140. The first plug 60 moves axially away from the first cup 20 upon expansion of the wax 28 in the first chamber 26, pushing the piston 140 away from the first cup 20.

A proximal end of the first guide 100 defines a first bore 103 having a first diameter. The first bore 103 extends away from the first cup 20 axially and circumscribes the first plug 60. As shown in FIGS. 1 and 2, the first bore 103 extends to an inner annular shoulder (seat) 104 that provides a hard stop (seat) for the piston flange 146. A second bore 106 having a second diameter that is greater than the first diameter of the first bore 103 extends axially toward the second cup 40 to an annular end 108 at a distal end of the first guide 100. The second bore 106 of the first guide 100 receives the piston flange 146 and a portion of the second guide 120. The return spring 160 extends from an outer surface of the first guide 100 to an outer surface of the second guide 120. In the disclosed embodiment, the return spring 160 is engages with spiral grooves disposed on the first and second guide 100, 120 to fix the position of the return spring 160 on the first and second guides 100, 120.

As shown in FIG. 3, the second cup 40 includes an open end 42, a closed end 44, and defines a second cylindrical chamber 46 filled with the wax 48 between the open end 42 and the closed end 44. The open end 42 is mechanically formed, swaged, or crimped over a radially extending flange 122 of the second guide 120 to permanently secure the flange 122 in an annular slot 50 of the second cup 40. The diaphragm 82 is trapped between the guide flange 122 and the cup 40. A second plug 80 includes a first end 83 that is in contact with the flexible diaphragm 82. The diaphragm 82 acts to contain the wax 48 within the second chamber 46 and delivers a variable actuating force $F_{A2}$ on the second plug 80 upon expansion of the wax 48 in the second chamber 46. The second plug 80 projects away from the second cup 40 and is surrounded by the second guide 120. A second end 84 of the second plug 80 abuts a second end 144 of the piston 140. The second plug 80 moves axially away from the second cup 40 upon expansion of the wax 48 in the second chamber 46.

A proximal end of the second guide 120 includes a radially extending shoulder 122 received in the slot 50 formed at the open end 42 of the second cup 40. A bore 52 is defined by the second guide 120 and extends away from the second cup 40 axially and circumscribes the second plug 80 and receives an end of the piston 140. The bore 52 extends to an annular end (seat) 124 at the distal end of the second guide 120 which acts a stop for the piston 140.

Figure 4:
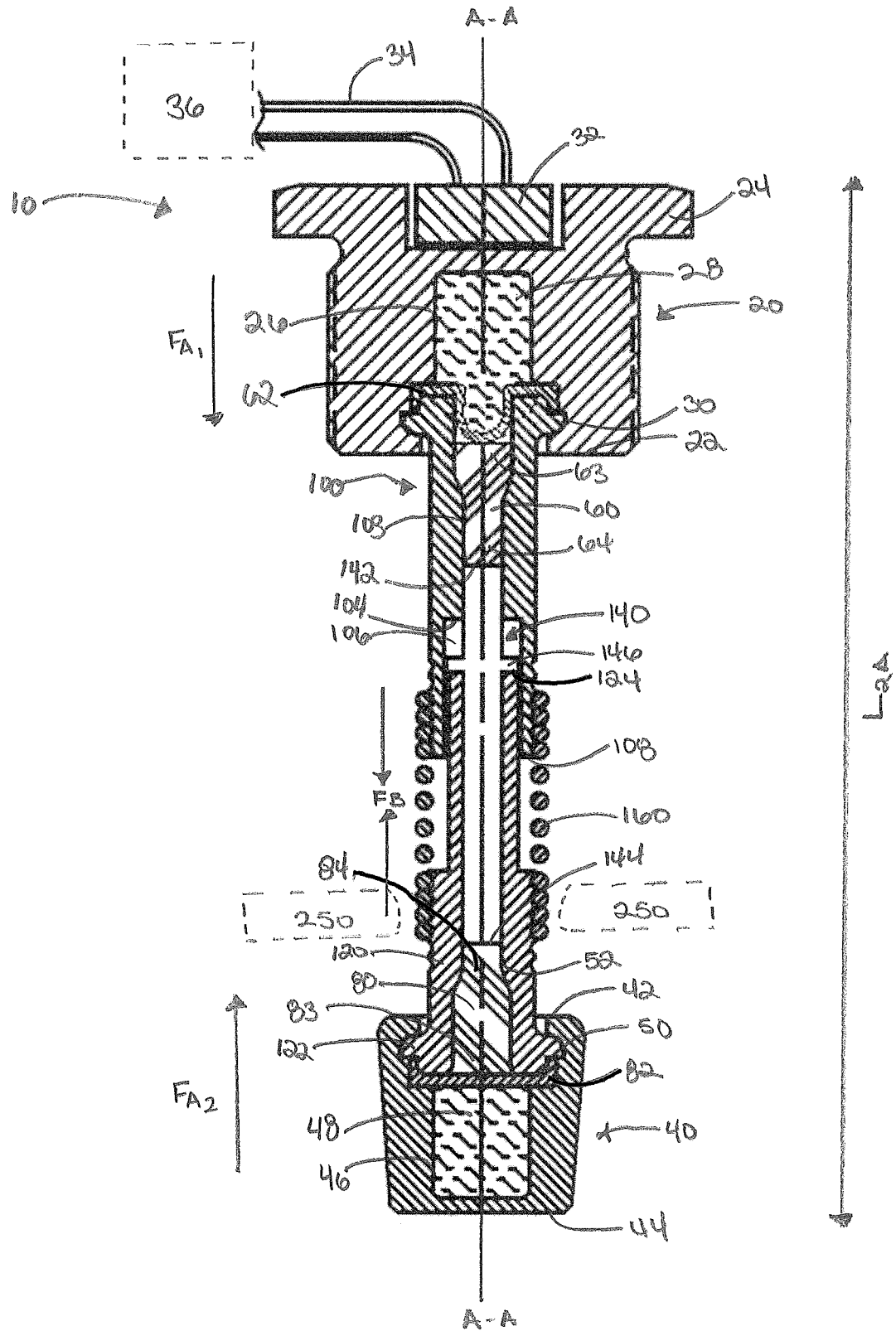
FIG. 4 is a front cross-sectional view of the actuator of FIG. 1.

The piston 140 includes a cylindrical body and is positioned axially between the first and second plugs 60, 80 in guide bores 103 and 52. The first end 142 of the piston 140 abuts the first plug 60 and the second end 144 of the piston 140 abuts the second plug 80. The piston 140 is surrounded by the first and second guides 100, 120. An annular flange 146 extends radially from the piston 140 concentric with the bore 106 of the first guide 100. The flange 146 extends from the piston at a point less than half way from the first end 142 of the piston 140 to the second end 144 of the piston 140. The flange 146 is positioned to abut the annular shoulder 104 of the first guide 100 and/or the annular end 124 of the second guide 120. As seen in FIG. 1, in the retracted position, the flange 146 is sandwiched between and abuts the annular shoulder 104 and the annular end 124 simultaneously. As seen in FIG. 2, in a passively actuated extended position, the flange 146 abuts only the annular shoulder 104, because the piston 140 has been moved away from the second cup 40 by expansion of wax 48. As illustrated by FIG. 4, in an actively actuated extended position, the flange 146 abuts only the annular end 124 of the second guide 120. As shown in FIG. 3, in a passively and actively actuated extended position, the flange 146 is axially-spaced from the annular shoulder 104 of the first guide 100 and the annular end 124 of the second guide end 120. The piston 140 is configured to move in a first direction away from the first cup 20 upon active expansion of the wax 28 in the first chamber 26 and in a second direction away from the second cup 40 upon passive expansion of the wax 48 in the second chamber 46.

Referring to FIGS. 4 and 5A, application of power to the resistance heater 32 included in the first cup 20 causes the wax 28 in the first chamber 26 to increase in temperature $\Delta T$ from a first temperature $T_1$ to a second predetermined temperature $T_2$, expanding as it melts. Expansion of the wax 28 applies force $F_{A1}$ on the diaphragm 62. The force $F_{A1}$ causes the diaphragm 62 to flex outward toward the piston 140 and exert the force $F_{A1}$ on the first end 63 of the first plug 60. The first plug 60 moves through the first bore 103 in the first direction and transfers the force $F_{A1}$ to the first end 142 of the piston 140. The piston 140 moves in the first direction away from the first cup 20 within the bore 106 causing the flange 146 to press against the annular end 124 of the second guide 120. The second cup 40 moves in the first direction away from the first cup 20, extending the return spring 160 and the length of the actuator 10. At the predetermined temperature $T_2$, the actuator 10 extends to a predetermined length $L_{2A}$ and the closed end 44 of the second cup 40 is no longer positioned within the opening 250 of the outlet, allowing fluid to exit the reservoir 300 and flow through the opening 250.

As shown in FIGS. 5A and 5B, the temperature range that causes the wax 28 in the first cup 20 to expand may be higher than the temperature range that causes the wax 48 in the second cup 40 to expand such that the threshold ambient temperature that causes expansion of the wax 48 in the second cup 40 does not also cause expansion of the wax 28 in the first cup 28.

A decrease in temperature $\Delta T$ of the wax 28 due to a reduction of power to the resistance heater 32 causes the wax 28 in the first chamber 26 to retract and reduce the force $F_{A1}$ exerted on the first plug 60 and the diaphragm 62. The first plug 60 moves in the second direction toward the first cup and reduces the application of the force $F_{A1}$ on the first end 142 of the piston 140. As the wax 28 returns to temperature $T_1$, the return force $F_B$ exerted by the return spring 160 on the first and second guides 100, 120 overcomes reduced force $F_{A1}$ and the second cup 40 returns to its position within the opening 250 of the outlet, restricting the flow of fluid from the reservoir 300.

Referring to FIGS. 2 and 5B, an increase in the temperature of the fluid in the reservoir 300 causes the wax 48 in the second chamber 46 to increase in temperature $\Delta T$ from a first temperature $T_3$ to a second temperature $T_4$, expanding as it melts. Expansion of the wax 48 applies force $F_{A2}$ on the diaphragm 82. The force $F_{A2}$ causes the diaphragm 82 to flex outward toward the piston 140 and exert the force $F_{A2}$ on the second plug 80. The second plug 80 moves through the bore 52 in the second direction away from the second cup 40 and transfers the force $F_A$ to the second end 144 of the piston 140. The flange 146 abuts the annular shoulder 104 of the first guide 100 and the force $F_{A2}$ exerted by the second plug 80 on the second end 144 of the piston 140 causes the second cup 40 to move in the first direction away from the first cup and extend the return spring 160. At a predetermined temperature $T_2$, the actuator 10 extends to the predetermined length $L_{2P}$ and the closed end 44 of the second cup 40 is no longer positioned within the opening 250 of the outlet, allowing fluid to exit the reservoir 300.

A decrease in temperature $\Delta T$ of the wax 48 due to a decrease in the temperature of the fluid in the reservoir 300 causes the wax 48 in the second chamber 46 to retract and reduce the force $F_{A2}$ exerted on the second plug 80 by the diaphragm 82. The second plug 80 then reduces the exertion of the force $F_{A2}$ on the second end 144 of the piston 140. As the wax 48 returns to temperature $T_3$, the return force $F_B$ exerted by the return spring 160 on the first and second guides 100, 120 overcomes reduced force $F_{A2}$ and the second cup 40 returns to its position within the opening 250 of the outlet, restricting the flow of fluid from the reservoir 300 through the opening 250.

As shown in FIGS. 3, 5A and 5B of the disclosed embodiment, a simultaneous active and passive increase in temperature $\Delta T$ of each wax 28, 48 causes each wax 28, 48 to expand. Each wax 28, 48 applies the forces $F_{A1}$ and $F_{A2}$, respectively, on the corresponding diaphragms 62, 82. The diaphragms 62, 82 flex outward and exert forces $F_{A1}$ and $F_{A2}$ on the corresponding first and second plugs 60, 80. The first plug 60 moves in the first direction and transfers the force $F_{A1}$ to the first end 142 of the piston 140 and the second plug 80 moves in the second direction and transfers the force $F_{A2}$ to the second end 144 of the piston 140. The forces $F_{A1}$ and $F_{A2}$ exerted on the first and second ends 142, 144 of the piston 140 extend the return spring 160. At predetermined temperatures $T_2$ and $T_4$ of each corresponding wax 28, 48, the actuator 10 extends to a predetermined length $L_3$ and the closed end 44 of the second cup 40 is no longer positioned within the opening 250 of the outlet, allowing fluid to exit the reservoir 300.

A decrease in temperature $\Delta T$ of each wax 28, 48 causes each wax 28, 48 to retract and reduce the forces $F_{A1}$ and $F_{A2}$ exerted on the corresponding first and second plugs 60, 80. The first plug 60 moves in the second direction and reduces the force $F_A$ exerted on the first end 142 of the piston 140. The second plug 80 moves in the first direction and reduces the force $F_A$ exerted on the second end 144 of the piston 140. As each wax 28, 48 returns to corresponding temperatures $T_1$ and $T_3$, the return force $F_B$ exerted by the return spring 160 on the first and second guides 100, 120 overcomes reduced forces $F_{A1}$ and $F_{A2}$ and the closed end 44 of the second cup 40 returns to its position within the opening 250 of the outlet, restricting the flow of fluid from the reservoir 300.

FIGS. 7A and 7B illustrate an installed configuration of the actuator 10 for use in a mixing valve within a housing or manifold 250. The actuator 10 is installed in the manifold 250 to which liquids of two different temperatures are delivered through hot and cold inlet ports 252, 254, respectively. The actuator 10 and an attached cylindrical slide 256 move axially in a bore 258 of the manifold 250, regulating fluid flow from the hot fluid inlet 252 and the cold fluid inlet 254 through a slot 260 into a mixing chamber 262 defined within the slide 256.

As described above, the plugs 60, 80 and piston 140 are configured to transmit force generated by thermal expansion of each wax 28, 48, which results in movement of the actuator 10 and slide 256 within the bore 258. The hot fluid inlet 252 is axially offset from the cold fluid inlet 254 along the bore 258, resulting in greater cold fluid flow and reduced hot fluid flow into the mixing chamber 262 as the slide 256 moves along the bore 258 from a cold (first) position, shown in FIG. 7A, toward the maximum hot (second) position, shown in FIG. 7B. At the cold position, the slot 260 in the slide 256 is aligned with and fully open to the hot fluid inlet 252 while the slide 256 covers the cold fluid inlet 254. At the maximum hot position, the slot 260 is fully open to the cold fluid inlet 254 while the slide 256 covers the hot fluid inlet 252. At most positions of the slide 256 between the cold and maximum hot positions, the slot 260 is partially open to both the hot and cold inlets 252, 254 producing a mixed fluid outflow within a pre-determined temperature range.

While the embodiment of the disclosed dual mode actuator 10 has been set forth for purposes of illustration, the foregoing description should not be deemed a limitation of the invention. Accordingly, various modifications, adaptations and alternatives may occur to one skilled in the art without departing from the spirit of the disclosure and the scope of the claimed coverage.

What is claimed:

1. An actuator for use in a fluid flow system comprising:
   a first cup defining a first chamber filled with thermally-responsive wax, the first cup having an open end and a closed end;
   a second cup defining a second chamber filled with thermally-responsive wax, the second cup having an open end and a closed end;
   a piston disposed between the first cup and the second cup, wherein the piston comprises a first end and an opposite second end;
   a first guide received in the open end of the first cup, the first guide surrounding the first end of the piston and extending axially away from the first cup; and
   a second guide received in the open end of the second cup and extending axially away from the second cup, the second guide surrounding the opposite second end of the piston;
   wherein the first guide surrounds a portion of the second guide, and
   wherein one of expansion of the wax in the first chamber or expansion of the wax in the second chamber causes the actuator to go from a retracted position to an extended position or expansion of the wax in the first chamber and expansion of the wax in the second chamber causes the actuator to go from the retracted position to the extended position.

2. The actuator of claim 1, wherein the first cup includes a resistance heater.

3. The actuator of claim 1, wherein the first cup includes a resistance heater, when said resistance heater is not receiving power said actuator is in the retracted position and when the resistance heater receives power the wax in the first chamber expands and said actuator is in the extended position.

4. The actuator of claim 3, wherein said second cup is exposed to an ambient heat source and when the temperature of the ambient heat source increases the wax in the second chamber expands causing said actuator to extend.

5. The actuator of claim 1, wherein the first guide includes an annular seat, the piston includes a radial flange extending outwardly and said portion of the second guide includes an annular end.

6. The actuator of claim 5, wherein in the retracted position the flange is sandwiched between and abuts the annular seat and the annular end.

7. The actuator of claim 6, wherein upon expansion of the wax in the first chamber the flange only abuts the annular end.

8. The actuator of claim 6, wherein upon expansion of the wax in the second chamber the flange only abuts the annular seat.

9. The actuator of claim 6, wherein upon expansion of each wax in the corresponding first and second chambers the flange is axially-spaced from the annular seat and the annular end.

10. The actuator of claim 1, wherein the piston is a one-piece member.

11. The actuator of claim 1, wherein the actuator further comprises a return spring extending from an outer surface of the first guide to an outer surface of the second guide.

12. The actuator of claim 5, wherein the first guide surrounds the flange.

13. A method of actuating an actuator, the method comprising:
    providing a first cup having a resistance heater and defining a first chamber filled with thermally-responsive wax;
    providing a second cup exposed to an ambient heat source and defining a second chamber filled with thermally-responsive wax;
    providing a piston positioned intermediate the first and second cups;
    wherein the first and second cups receive corresponding first and second guides, wherein the first guide surrounds a first end of the piston, wherein the second guide surrounds an opposite second end of the piston, and wherein the first guide surrounds a portion of the second guide;
    wherein, an increase in temperature of the resistance heater causes the thermally-responsive wax in the first chamber to expand and the actuator to go from a retracted position to an extended position, and
    wherein, an increase in temperature of the ambient heat source causes the thermally-responsive wax in the second chamber to expand and the actuator to go from the retracted position to the extended position.

14. The method of claim 13, wherein the piston is a one-piece member.

15. The method of claim 13, wherein the first guide includes an annular seat, the piston includes a radial flange extending outwardly and said portion of the second guide includes an annular end, and wherein the first guide surrounds the flange.

16. The method of claim 13, further comprising providing a return spring extending from an outer surface of the first guide to an outer surface of the second guide.

17. An actuator for use in a fluid flow system comprising:
    a first cup defining a first chamber filled with thermally-responsive wax, the first cup having an open end and a closed end;
    a second cup defining a second chamber filled with thermally-responsive wax, the second cup having an open end and a closed end;
    a piston disposed between the first cup and the second cup, wherein the piston comprises a first end and an opposite second end, the piston including a radial flange extending outwardly;
    a first guide received in the open end of the first cup, the first guide surrounding the first end of the piston and extending axially away from the first cup, the first guide including an annular seat; and
    a second guide received in the open end of the second cup and extending axially away from the second cup, the second guide surrounding the opposite second end of the piston and including an annular end;
    wherein one of expansion of the wax in the first chamber or expansion of the wax in the second chamber causes the actuator to go from a retracted position to an extended position or expansion of the wax in the first chamber and expansion of the wax in the second chamber causes the actuator to go from the retracted position to the extended position, and wherein in the retracted position the flange is sandwiched between and abuts the annular seat and the annular end.

18. The actuator of claim 17, wherein upon expansion of the wax in the first chamber the flange only abuts the annular end.

19. The actuator of claim 17, wherein upon expansion of the wax in the second chamber the flange only abuts the annular seat.

20. The actuator of claim 17, wherein upon expansion of each wax in the corresponding first and second chambers the flange is axially-spaced from the annular seat and the annular end.

21. The actuator of claim 17, wherein the actuator further comprises a return spring extending from an outer surface of the first guide to an outer surface of the second guide.

* * * * *